US011614915B1

(12) United States Patent
Beckmann

(10) Patent No.: US 11,614,915 B1
(45) Date of Patent: Mar. 28, 2023

(54) AUDIO MULTITHREADING INTERFACE

(71) Applicant: DSP Concepts, Inc., Santa Clara, CA (US)

(72) Inventor: Paul Eric Beckmann, Sunnyvale, CA (US)

(73) Assignee: DSP Concepts, Inc., Santa Clara, CA (US)

(*) Notice: Subject to any disclaimer, the term of this patent is extended or adjusted under 35 U.S.C. 154(b) by 0 days.

(21) Appl. No.: 17/554,392

(22) Filed: Dec. 17, 2021

(51) Int. Cl.
G06F 3/0481 (2022.01)
G06F 3/16 (2006.01)
G06F 9/38 (2018.01)

(52) U.S. Cl.
CPC ............ G06F 3/162 (2013.01); G06F 3/165 (2013.01); G06F 9/3851 (2013.01)

(58) Field of Classification Search
CPC .......... G09G 2354/00; G09G 2370/02; G09G 2370/027; G09G 2360/12; G09G 3/36; H04R 25/407; H04R 25/554; H04R 2420/07; H04R 2225/43; H04R 25/43; H04R 27/00; H04R 5/04; H04R 1/406; H04R 2201/401; H04R 2225/55; H04R 2430/21; H04R 25/558; H04R 25/70; H04R 3/005; H04R 1/04; H04R 1/2876; H04R 2201/403; H04R 2430/20; H04R 31/006; G06F 3/165; G06F 3/016; G06F 3/0482; G06F 1/3212; G06F 1/324; G06F 1/3275; G06F 1/3287; G06F 3/04883; G06F 16/683; G06F 16/634; G06F 16/68; G06F 16/785; G06F 3/04842; G06F 3/04847; G06F 13/1673; G06F 13/3625; G06F 13/4291; G06F 15/16; G06F 16/245; G06F 16/3334; G06F 16/433; G06F 21/105; G06F 21/16; G06F 3/162; G06F 9/466
See application file for complete search history.

(56) References Cited

U.S. PATENT DOCUMENTS

| 2003/0192027 | A1 | 10/2003 | Porter | |
| 2006/0179279 | A1 | 8/2006 | Jones et al. | |
| 2015/0348225 | A1 | 12/2015 | Schreyer et al. | |
| 2017/0068504 | A1* | 3/2017 | Trama | H04R 29/00 |
| 2019/0272144 | A1* | 9/2019 | Kotelly | G06F 3/0482 |
| 2022/0360882 | A1* | 11/2022 | Chan et al. | H04W 76/15 |

* cited by examiner

Primary Examiner — Rayeez R Chowdhury
(74) Attorney, Agent, or Firm — Schwegman Lundberg & Woessner, P.A.

(57) ABSTRACT

Generating an audio processing design includes placing representations of audio processing modules using a user interface. The method includes causing the display of the representations of the audio processing modules in the user interface, receiving user input to place a representation of a start thread module in the audio processing design between a representation of an upstream audio module and representations of downstream audio modules, the representation of the start thread module having data associated therewith that defines a buffer up factor and a thread identifier, receiving user input to specify the buffer up factor and thread identifier associated with the representation of the start thread module, and applying the specified thread identifier and a sample block size that is derived from the specified buffer up factor, downstream from the representation of the thread start module.

20 Claims, 10 Drawing Sheets

AUDIO MULTITHREADING INTERFACE

BACKGROUND

Current audio playback devices, such as headphones, earbuds, smart speakers and so forth, have become more sophisticated and connected. The audio processing power that is available for use in such products has increased substantially. In order for developers of and for such products to be able to exploit the available audio processing capabilities, it is useful to provide convenient and effective audio processing design tools.

BRIEF DESCRIPTION OF THE SEVERAL VIEWS OF THE DRAWINGS

Some example embodiments of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

DETAILED DESCRIPTION

Figure 1:
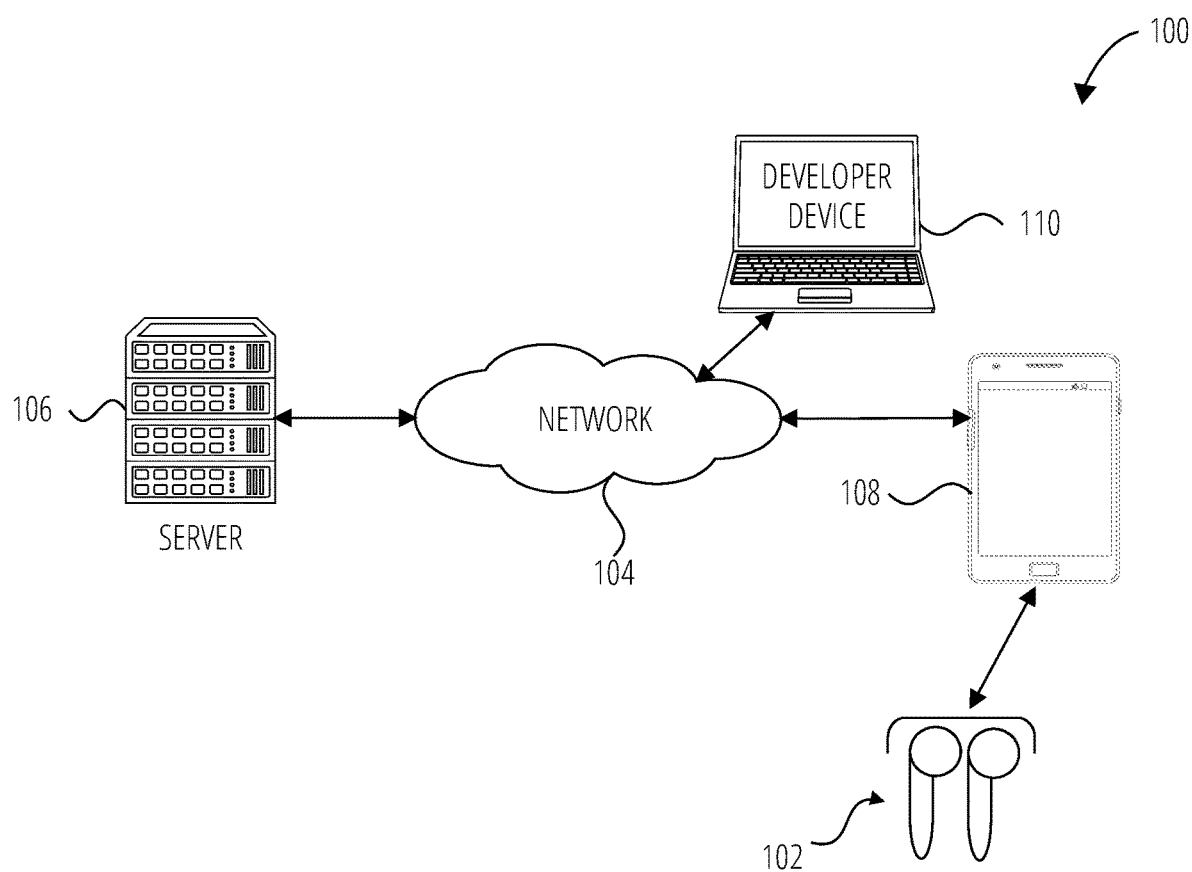
FIG. 1 illustrates a system in which a server, a client device and a developer device are connected to a network according to some examples.

In some examples, a method executed by one or more processors, includes receiving user input to generate an audio processing design by placing representations of audio processing modules in a user interface, causing the display of the representations of the audio processing modules in the user interface, receiving user input to place a representation of a start thread module in the audio processing design between a representation of an upstream audio module and representations of downstream audio modules, the representation of the start thread module having data associated therewith that defines a buffer up factor and a thread identifier, causing the display of the representation of the start thread module in the audio processing design, receiving user input to specify the buffer up factor and thread identifier associated with the representation of the start thread module, applying the specified thread identifier and a sample block size that is derived from the specified buffer up factor, downstream from the representation of the thread start module such that the sample block size and the specified thread identifier are associated with the representations of the downstream audio modules, and specifying the audio processing design based on an arrangement of the representations of the audio processing modules displayed in the user interface.

The buffer up factor may be settable to or default to 1 (one), and the thread identifier may include a thread number that is an integer value corresponding to multiples of an audio processing design input block size. In some examples, the sample block size is an audio processing design input block size multiplied by the buffer up factor and a thread number of an input thread to the start thread module. The thread identifier may include a subsidiary thread ID letter of the alphabet includes a next available letter of the alphabet.

The method may also further include receiving user input to place a representation of a stop thread module in the audio processing design downstream of the representation of the start thread module, wherein applying the specified thread ID and the sample block size downstream from the representation of the start thread module comprises associating the specified thread ID and the sample block size with representations of downstream audio modules up to and including the representation of the stop thread module. An initial value of a buffer down value associated with the representation of the stop thread module may correspond to the buffer up value associated with the upstream representation of the start thread module, and an initial value of a thread number associated with the representation of the stop thread module corresponds to a downstream thread number.

According to some examples, provided is a non-transitory computer-readable storage medium, the computer-readable storage medium including instructions that when executed by a computer, cause the computer to perform operations with the elements described in the methods above, including but not limited to operations comprising receiving user input to generate an audio processing design by placing representations of audio processing modules in a user interface, causing the display of the representations of the audio processing modules in the user interface, receiving user input to place a representation of a start thread module in the audio processing design between a representation of an upstream audio module and representations of downstream audio modules, the representation of the start thread module having data associated therewith that defines a buffer up factor and a thread identifier, causing the display of the representation of the start thread module in the audio processing design, receiving user input to specify the buffer up factor and thread identifier associated with the representation of the start thread module, applying the specified thread identifier and a sample block size that is derived from the specified buffer up factor, downstream from the representation of the thread start module such that the sample block size and the specified thread identifier are associated with the representations of the downstream audio modules, and specifying the audio processing design based on an arrangement of the representations of the audio processing modules displayed in the user interface.

Still further, according to some examples, provided is a computing apparatus comprising a processor and a memory storing instructions that, when executed by the processor, configure the apparatus to perform operations with the elements described in the methods above. The operations include but are not limited to operations comprising receiving user input to generate an audio processing design by placing representations of audio processing modules in a user interface, causing the display of the representations of the audio processing modules in the user interface, receiving user input to place a representation of a start thread module in the audio processing design between a representation of an upstream audio module and representations of downstream audio modules, the representation of the start thread module having data associated therewith that defines a buffer up factor and a thread identifier, causing the display of the representation of the start thread module in the audio processing design, receiving user input to specify the buffer up factor and thread identifier associated with the representation of the start thread module, applying the specified thread identifier and a sample block size that is derived from the specified buffer up factor, downstream from the representation of the thread start module such that the sample block size and the specified thread identifier are associated with the representations of the downstream audio modules, and specifying the audio processing design based on an arrangement of the representations of the audio processing modules displayed in the user interface.

Other technical features may be readily apparent to one skilled in the art from the following figures, descriptions, and claims.

FIG. 1 illustrates a system 100 in which a server 106, a client device 108 and a developer device 110 are connected to a network 104.

In various embodiments, the network 104 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 104 may also include a voice network that conveys not only voice communications, but also non-voice data such as Short Message Service ("SMS") messages, as well as data communicated via various cellular data communication protocols, and the like.

In various embodiments, the client device 108 may include desktop PCs, mobile phones, laptops, tablets, wearable computers, or other computing devices that are capable of connecting to the network 104 and communicating with the server 106, such as described herein. The client device 108 may be paired with wireless ear buds 102 (or other audio playback devices) that provide audio output to a user of the client device 108. Additionally, one or more developer devices 110 may be utilized to generate downloadable binary files that may be used to customize the audio output of the wireless ear buds 102. The developer device 110 may for example have one or more of the components and characteristics of the machine 1000 described herein with reference to FIG. 10, including one or more processors 1002, memory 1004 and I/O components 1042 such as a display and a keyboard, and so forth.

In various embodiments, additional infrastructure (e.g., short message service centers, cell sites, routers, gateways, firewalls, and the like), as well as additional devices may be present. Further, in some embodiments, the functions described as being provided by some or all of the server 106 and the client device 108 may be implemented via various combinations of physical and/or logical devices. However, it is not necessary to show such infrastructure and implementation details in FIG. 1 in order to describe an illustrative embodiment.

Figure 2:
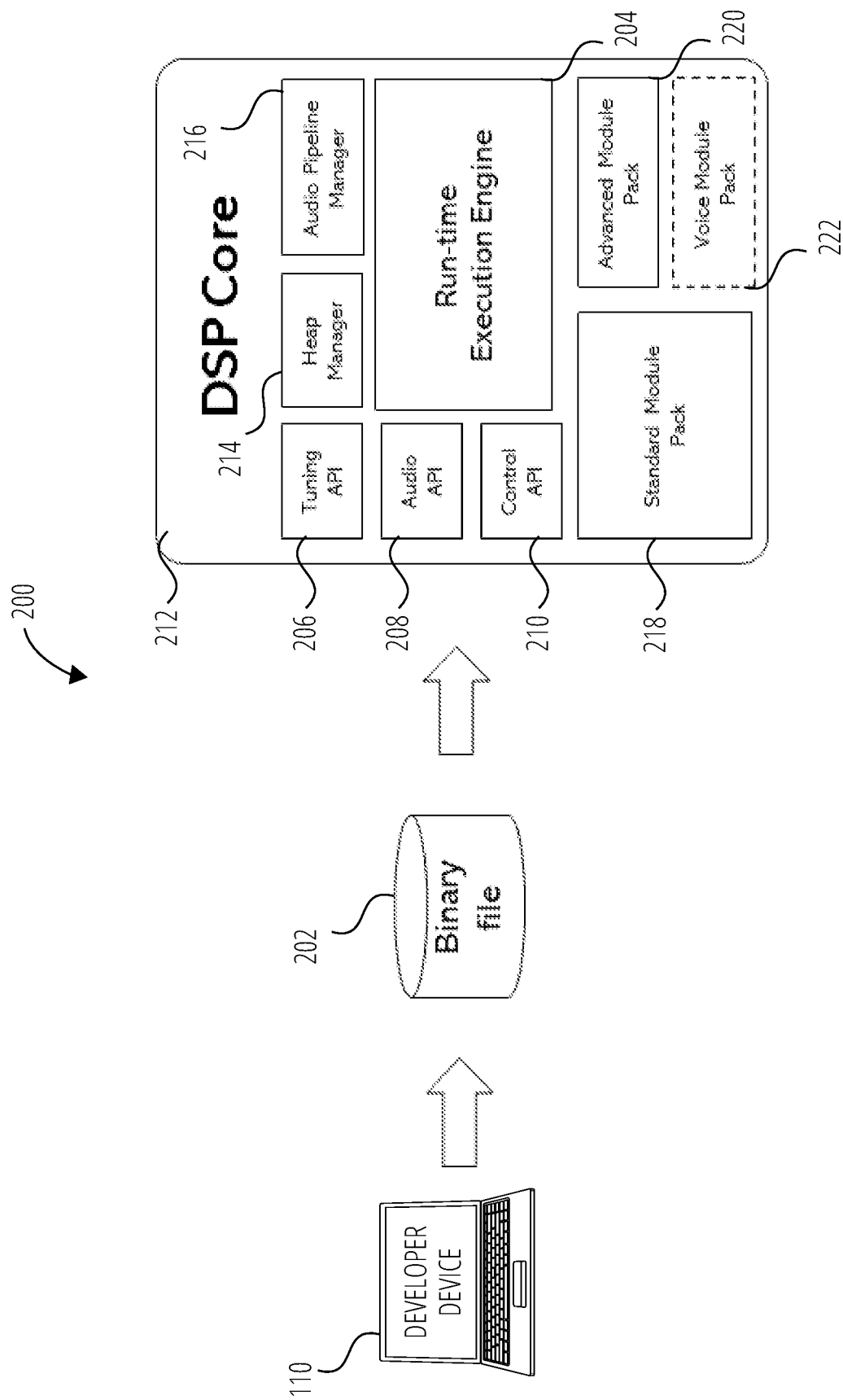
FIG. 2 illustrates a development and implementation flow diagram according to some examples.

FIG. 2 illustrates a development and implementation flow diagram 200 according to some examples. Shown in the figure are a developer device 110, a binary file 202 and an audio DSP core 212.

The developer device 110 hosts a software application for use in designing and developing audio features for the audio DSP core 212. The developer device 110 can be utilized by the developer of the audio device (such as wireless ear buds 102) or a third-party developer of original audio processing, add-ons or updates for the audio device.

The application on the developer device 110 is preferably a windows-based graphical design environment that permits the definition of audio processing pathways by assembling and interconnecting various audio processing blocks and specifying associated parameters and interconnections. The final output of the application is the binary file 202.

The binary file 202 is a configuration file for the data-driven audio DSP core 212 that specifies which audio modules in the audio DSP core 212 to use, how they are interconnected, and which parameter settings to employ to provide custom audio processing. The binary file 202 is a platform independent data file that targets specific run-time libraries in the audio DSP core 212.

The audio DSP core 212 is an embedded audio processing engine that includes optimized target-specific libraries for various audio processing applications. The audio DSP core 212 is available for multiple processors and supports multicore and multi-instance implementations. In some examples, the audio DSP core 212 includes a run-time execution engine 204 that can be controlled by multiple API's such as a tuning API 206, an audio API 208, and a control API 210. The 212 also includes a memory manager 214 and an audio pipeline manager 216. The audio DSP core 212 also includes various audio processing module packs, such as a standard module pack 218, advanced module pack 220 and a voice module pack 222. As indicated by the dashed outline for the voice module pack 222, the exact number and types of different packs will depend on the particular implementation.

Figure 3:
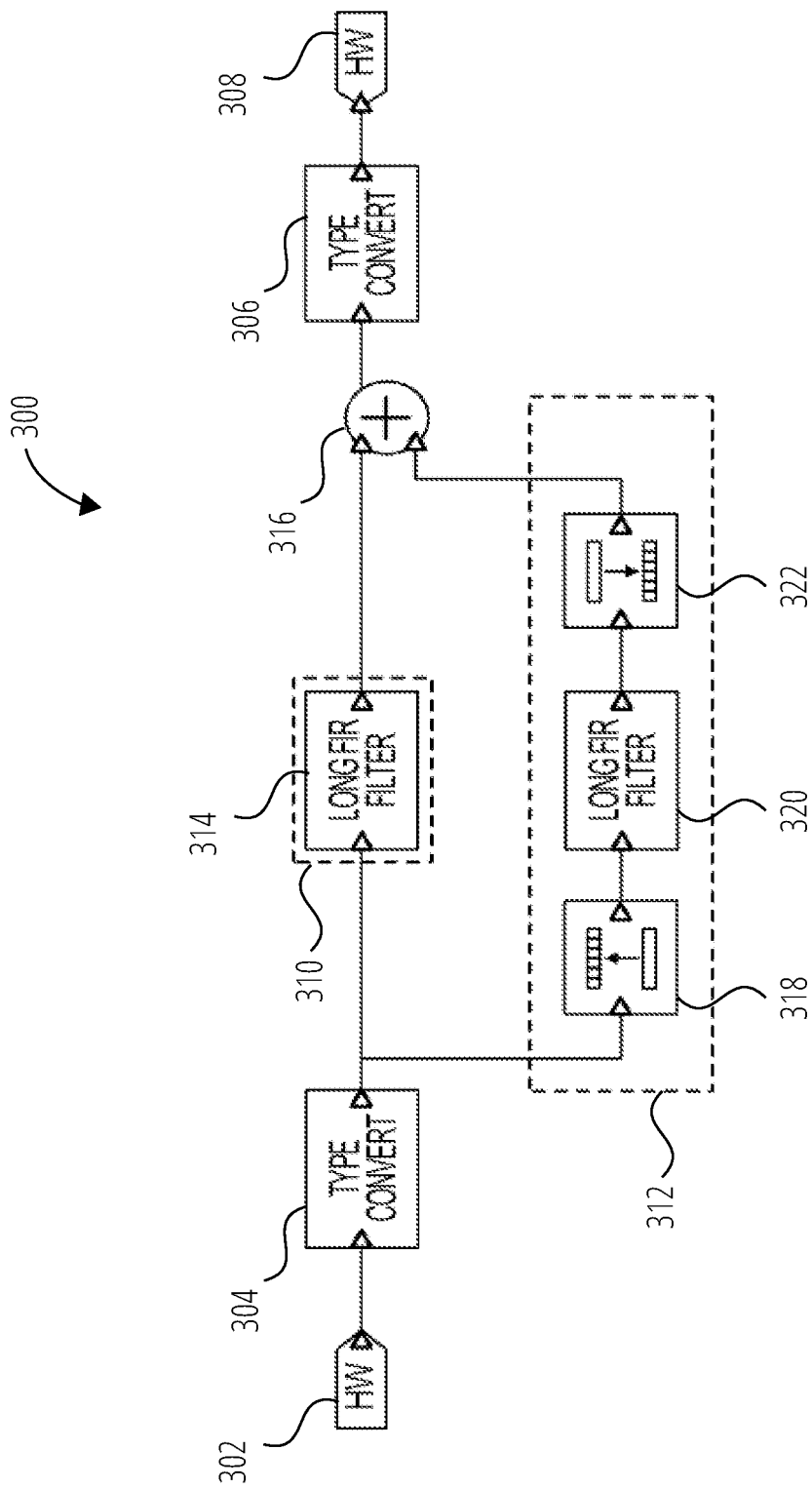
FIG. 3 illustrates a simple audio processing design according to some examples.

FIG. 3 illustrates a simple audio processing design 300 according to some examples. The design 300 is generated using a design interface on an audio design application running on the developer device 110. The design interface provides a number of audio modules that can be used to build up sophisticated audio functions using a graphical user interface, similar to circuit design. The design interface permits selected audio modules to be placed in a design, modules to be interconnected, and the parameters of different modules to be specified.

Upon completion of the design 300, the application hosted by the developer device 110 generates a corresponding binary file 202 or netlist corresponding to the design 300, which can be embedded or downloaded to an audio product, to provide the specified audio processing in conjunction with the audio DSP core 212.

It will be appreciated that the audio processing modules provided in the design interface are representations of the actual audio processing modules that are or may be available in the audio DSP core 212, and are not the actual audio processing modules themselves. Associated with the representations of the audio processing modules used in the design interface is a collection of data that is used by the application hosted by the developer device 110 to generate the binary file 202, including an identification of the particular audio processing module in the audio DSP core 212 and its parameters. Unless the context indicates otherwise, "an audio processing module" for purposes of the design interface is understood, for the sake of convenience, to include "a representation of an audio processing module."

In the illustrated example, design 300 includes an input pin 302 that receives digital audio stream at an input block size of, for example, 32 samples. The digital audio stream is first converted into an appropriate format for processing by a type conversion 304 block. At the end of the design 300, similar operations occur in reverse, with the output digital audio stream being converted back into the system format by a type conversion 306 before being provided to an output pin 308.

The design 300 also includes two example threads—a first thread 310 and a second thread 312. The first thread 310 is a low latency path that implements an FIR filter module 314 using the 32 sample block size of the input audio data steam. The second thread 312 is a more efficient implementation in which an FIR filter module 320 operates on a 256 sample block size. To permit this to occur, the audio input stream is buffered up in start thread module 318 from 32 samples to 256 samples and is then buffered down from 256 samples back to 32 samples in stop thread module 322 to permit adding of the outputs of the two threads at adder 316. As is known in the art, buffering up and down in this manner introduces a latency that is equal to twice the larger block size. In design 300, the added latency is thus 512 samples. The second thread 312 runs at a lower priority in both single and multicore systems.

The priority of thread execution depends on the integer thread number and an alphabetical subordinate thread ID letter. All subordinate threads operating on the block size of the input stream have a thread number of 1. The thread number for all other threads corresponds to the buffer up factor specifying how far the thread has been buffered up from the block size of the input stream. So, using the example above, all subordinate threads operating on the 32 sample input block size will have a thread number of 1, threads operating on a 64 sample block size (buffered up by factor of 2 from the input sample block size) will have a thread number of 2, subordinate threads operating on a 256 sample block size (buffered up factor of 8 from the input sample block size) will have a thread number of 8, and so forth.

Integer values corresponding to multiples of input block sizes is also known as the "clock divider." So a thread that is buffered up by a factor of 2 from the input sample block size will have a thread number of 2 which is also a multiple of 2 of the clock divider. The thread number downstream of a start thread module also depends on the thread number at the input to the start thread module. So, for example, if a start thread module has an input thread with a thread number of 2 and the start thread module has a buffer up factor of 4, the thread number exiting the start thread module will be 8, since the sample block size received at the start thread module will be at a 64 sample block size (buffered up twice already), which is then buffered up by a factor of 4 to a 256 sample block size, or buffered up by factor of 8 from the input sample block size. The thread number is thus typically the input thread number of the start thread module multiplied by the buffer up factor.

The initial priority of thread processing is based on the thread number, so that all subordinate threads in thread 1 will have a higher priority than subordinate threads having a higher thread number. The priority of subordinate threads in the same thread will depend on the alphabetical thread subordinate ID, which is user-specified. So subordinate thread 1C has a higher priority than subordinate thread 2A but has a lower priority than subordinate thread 1B. That is, multiple subordinate threads at the same block size are permitted, and priority of the subordinate threads within the thread is based on the letter of the alphabet within that thread.

The start thread module 318 and stop thread module 322 include a number of parameters and features. In particular, a) the number of input and output pins can be specified for both the start thread module 318 and the stop thread module 322, b) a buffer up factor can be specified for a start thread module 318, c) a buffer down factor can be specified for the stop thread module, and a thread subordinate ID can be specified in the start thread module 318.

Notably, a buffer up factor of 1 can be specified in the start thread module, which does not actually buffer up the audio block size but maintains the audio block size received at the input pin for the start thread module. This permits the creation of multiple threads at an initial or current block size, without requiring actual buffering up for thread creation.

Furthermore, in the design interface, an example of which is shown in FIG. 3, a change in the selection of properties in a start thread module 318 will propagate those changes through the modules in the corresponding subordinate thread all the way to a stop thread module 322. In particular, the new block size for the thread, which corresponds to a multiple of the original input block size as described above, will be specified for the audio processing modules in the thread.

Figure 4:
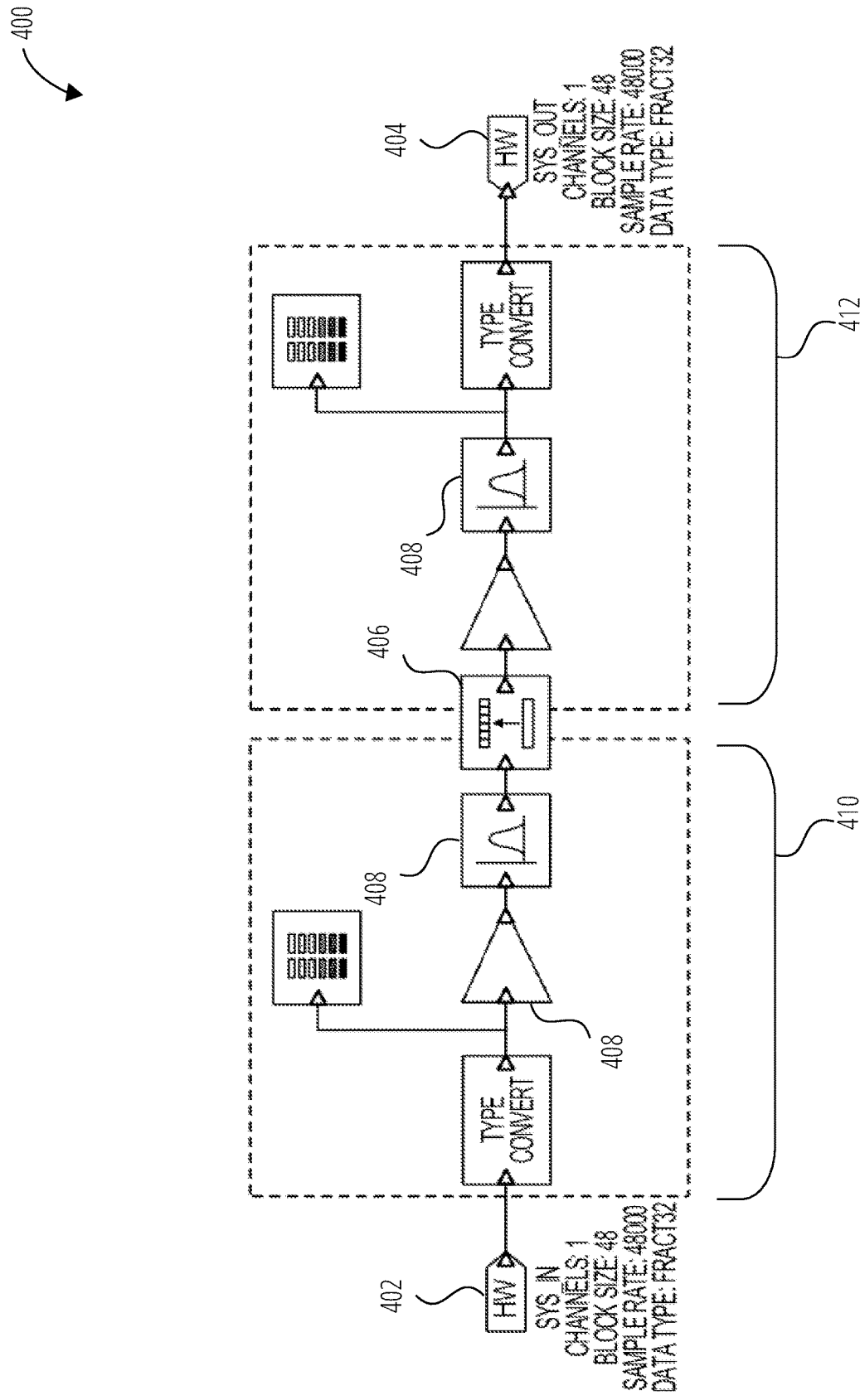
FIG. 4 illustrates an audio processing design 400 showing the creation of a new thread according to some examples.

FIG. 4 illustrates an audio processing design 400 showing the creation of a new thread according to some examples. The design 400 specifies audio processing between an input pin 302 and an output pin 404. The design 400 includes a number of audio processing modules 408 between the input pin 402 and the output pin 404. A start thread module 406 has been inserted in the audio processing path to split the design into a first thread 410 and a second thread 412.

Figure 5:
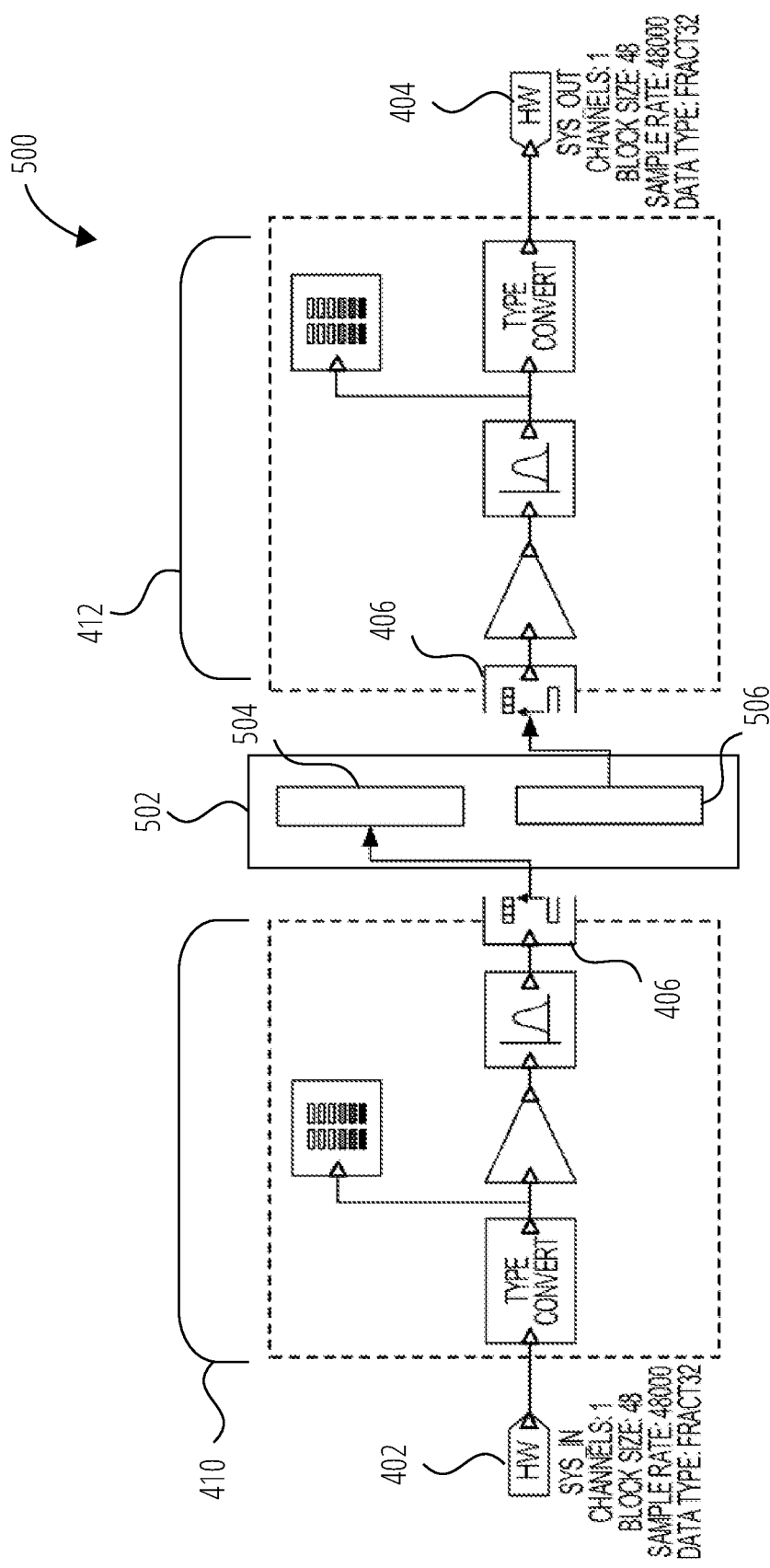
FIG. 5 shows the design of FIG. 4 in which the effect of the creation of a new thread is illustrated in more detail according to some examples.

FIG. 5 shows the design 400 of FIG. 4 in which the effect of the creation of a new thread is illustrated in more detail. In particular, the start thread module 406 in design 500 can be seen to include a subsystem 502 that includes a FIFO-in module 504 and a FIFO-out module 506. The FIFO-in module 504 includes a circular buffer that is twice the size of the output block size. Input blocks are received by the FIFO-in module 504 from the first thread 410 and when sufficient blocks have been loaded into FIFO-in module 504 to provide an output block, a corresponding output block is passed to the FIFO-out module 506 from where it is in turn passed to the second thread 412. The time it takes to perform this operation introduces a latency equal to twice the output block size, but the first and second threads can now be processed in parallel.

Figure 6:
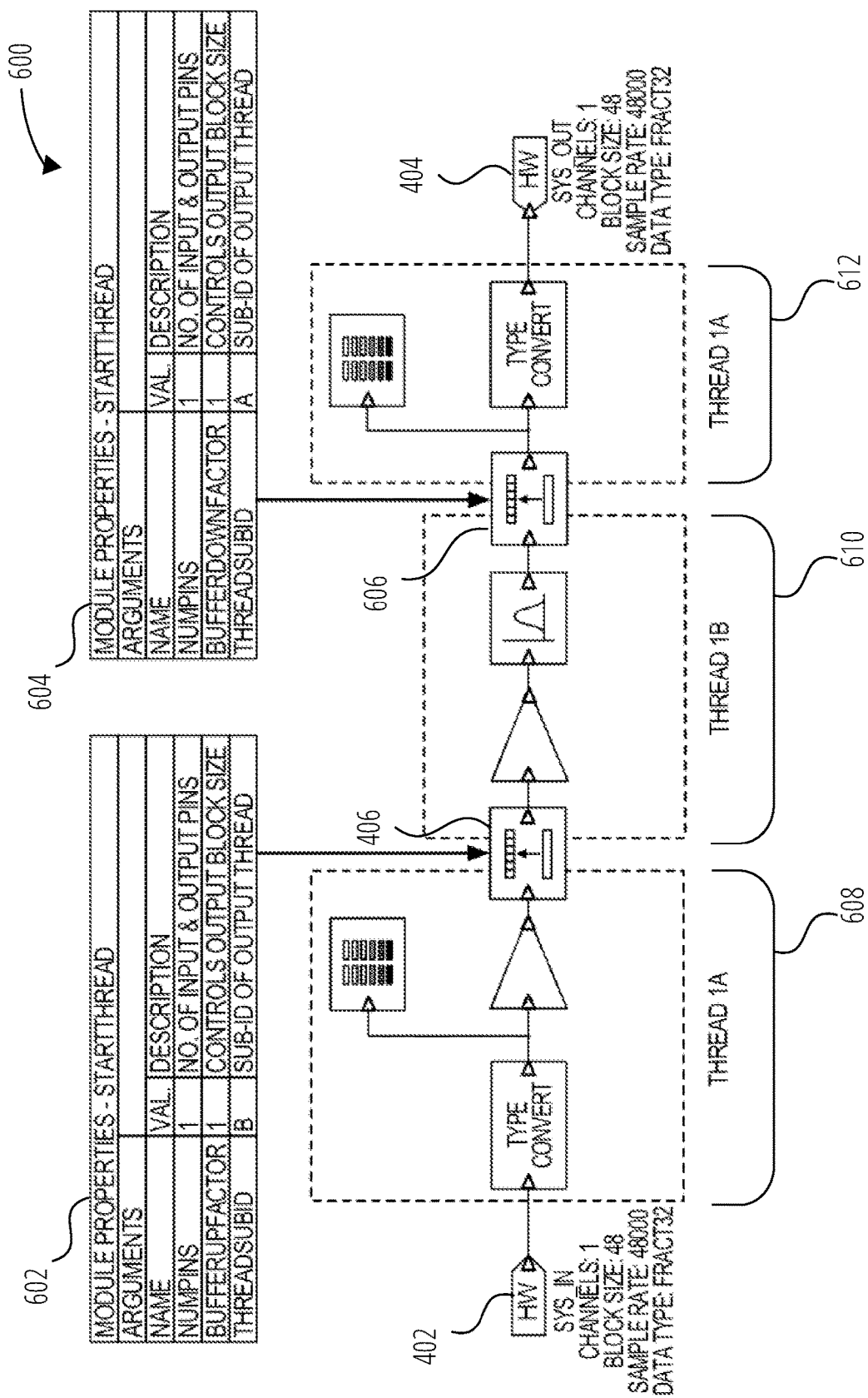
FIG. 6 shows the design 400 of FIG. 4 including a stop thread module 606 and dialog boxes for specifying thread parameters according to some examples.

FIG. 6 shows the design 400 of FIG. 4 including a stop thread module 606 and dialog boxes for specifying thread parameters. As can be seen, in design 600, a stop thread module 606 has been added to the design 400 to terminate the thread that was started by start thread module 406. Associated with the start thread module 406 is a dialog box 602 that can be used to specify the number of input and output pins for the start thread module 406, the buffer up factor, and the thread subordinate ID. In this case, the number of input and output pins is 1, the buffer up factor is 1 and the thread subordinate ID is B. Since the input pin 402 is at the system block size and the buffer up factor is 1, the thread 610 between the start thread module 406 and stop thread module 606 will be Thread 1B while the thread 608 up to the start thread module 406 is Thread 1A.

Thread 610 (1B) terminates at stop thread module 606. Associated with the stop thread module 606 is a dialog box 604 that can be used to specify the number of input and output pins for the stop thread module 606, the buffer down factor and the thread subordinate ID. In this case, the number of input and output pins is 1, the buffer up factor is 1 and the downstream thread subordinate ID is A. Since the output pin 404 pin is at the system block size and the buffer up factor is 1, the thread 612 between the stop thread module 606 and the output pin 404 will return to form part of Thread 1A.

Figure 7:
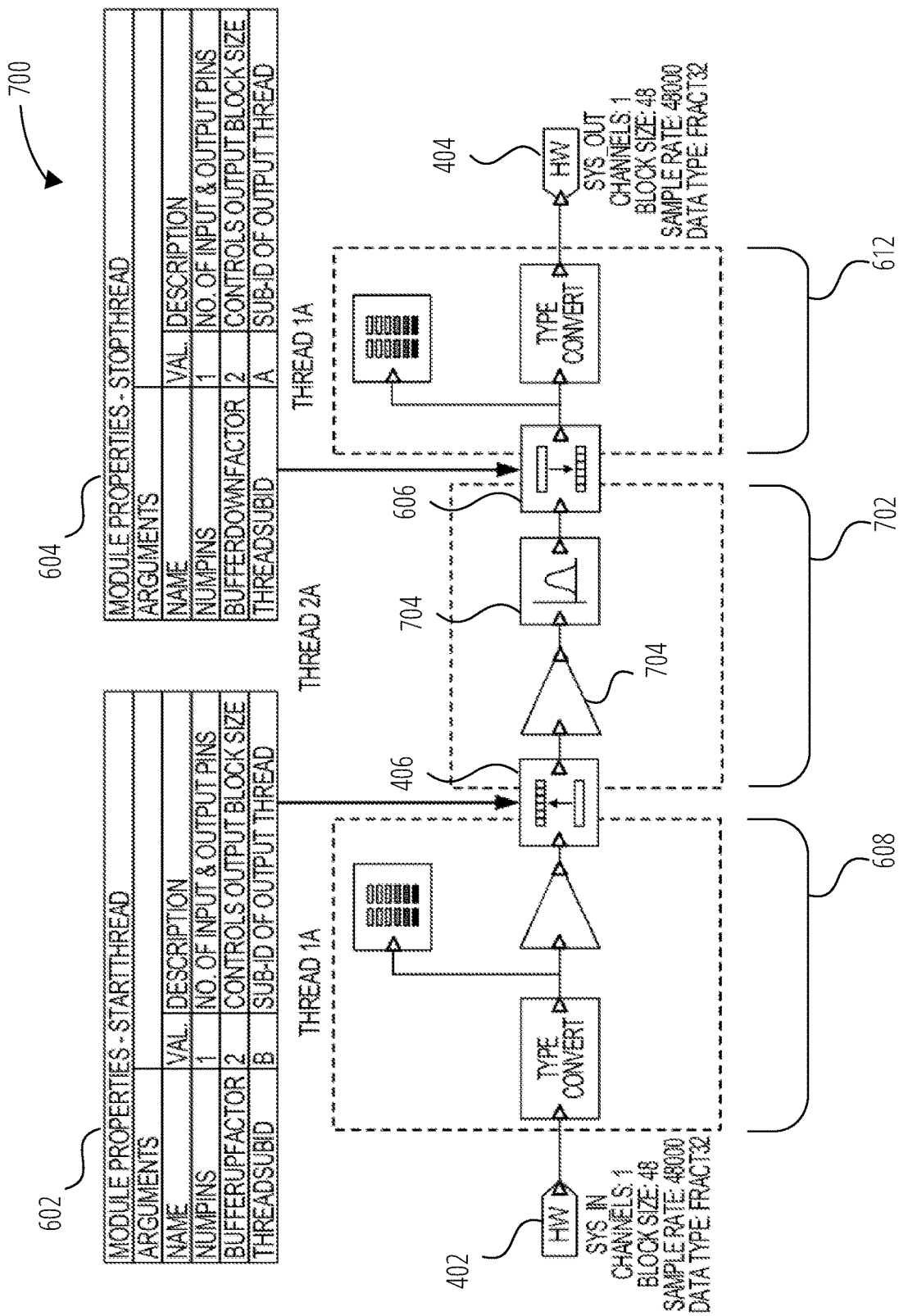
FIG. 7 shows the design 400 of FIG. 4 in which an adjustment has been made to the buffer up factor in the start thread module according to some examples.

FIG. 7 shows the design 400 of FIG. 4 in which an adjustment has been made to the buffer up factor in start thread module 406. In particular, in design 700, the buffer up factor in dialog box 602 has been set to 2. Since this is the first subordinate thread in with a buffer up factor of 2 (such that it operates on block sizes that are twice the size of the input block size), the thread 702 between the start thread module 406 and stop thread module 606 will be Thread 2A while the thread 608 up to the start thread module 406 remains as Thread 1A. The thread subordinate ID will normally default to the next available letter in the alphabet (A in this case), but it can be specified explicitly by the user.

When the parameters in dialog box 602 for start thread module 406 are updated in this manner, the changes propagate down-thread up to and including the stop thread module 606. For example, by specifying a buffer up factor of two, to increase the block size in thread 702 to twice the input block size, corresponding updates are made to the parameters (such as the block size) of the modules 704 that comprise thread 702. Additionally, the buffer down factor for the stop thread module 606 is also automatically set to 2, to ensure that the correct output block size is maintained for thread 612. Thread 608 and thread 612 remain part of Thread 1A as before.

Figure 8:
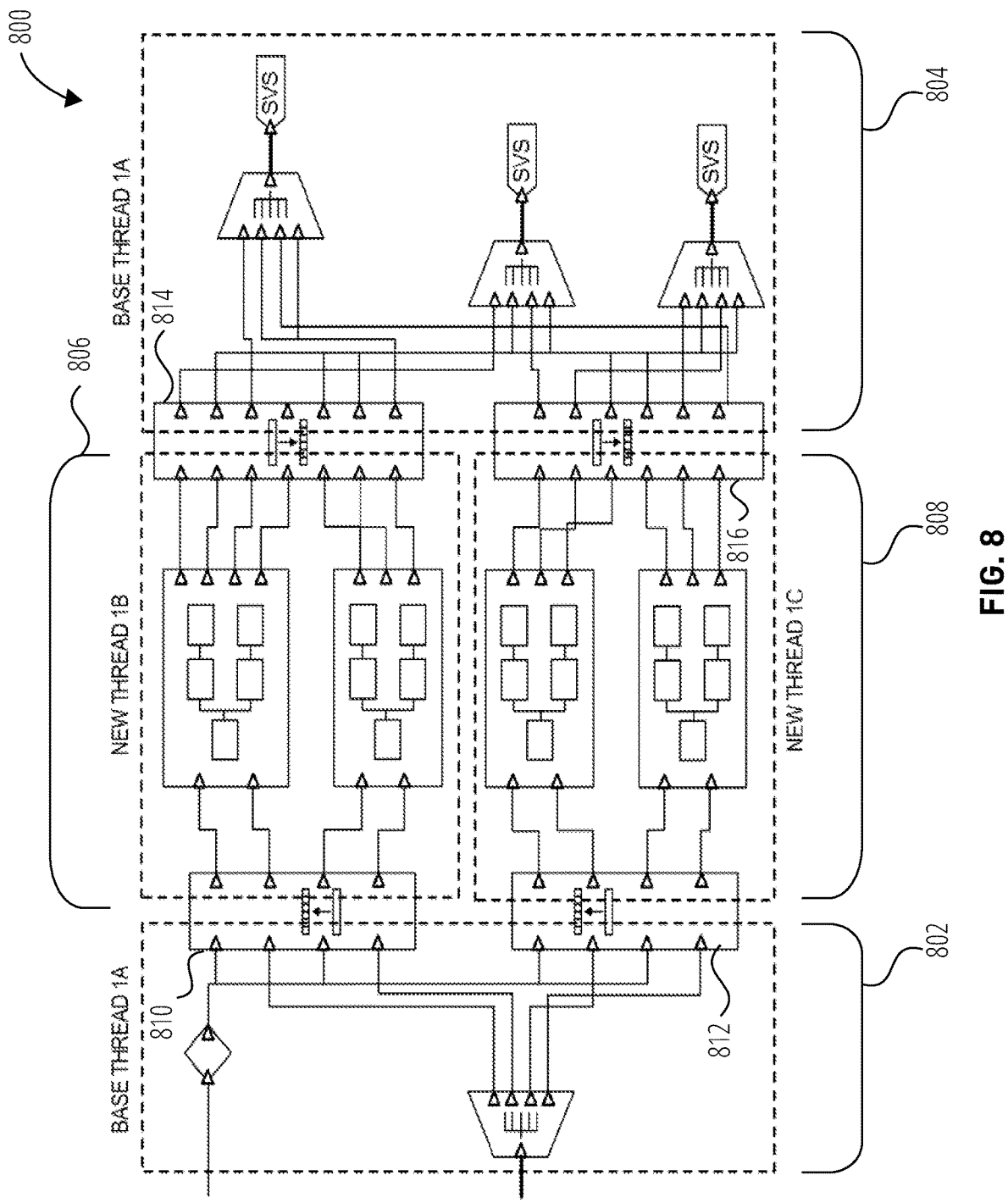
FIG. 8 illustrates an audio processing design 800 showing the creation of a new thread that includes multiple subordinate threads, and the use of start and stop thread modules according to some examples.

FIG. 8 illustrates an audio processing design 800 showing the creation of a new thread that includes multiple subordinate threads, and the use of start and stop thread modules including multiple pins. The design includes Base Thread 1A comprising thread 802 and thread 804, New Thread 1B (806) and New Thread 1C (thread 808). 806 and thread 808 have been added to the design generally as discussed herein with reference to the other figures. 806 starts at start thread module 810 and terminates at stop thread module 814. Since start thread module 810 and stop thread module 812 receive audio at the input block size, and 806 is identified as 1B and thread 808 is identified as 1C, it can be concluded that the buffer up and buffer down factors in the start thread module 810, stop thread module 812, stop thread module 814 and stop thread module 816 have been set to 1, and the priority of the threads is thread 802 (1A) followed by 806 (1B) followed by thread 808 (1c).

Also as can be seen, the start and stop thread modules include multiple input and output pins. Each input pin has a corresponding output pin, to which the audio blocks from the input pin are passed after being buffered up or down as specified in the particular start or stop thread module. So, for example, stop thread module 812 includes four input and four output pins. The input at each input pin is passed to its corresponding output pin, after being buffered up as specified by the buffer up factor, and with a subordinate thread ID, as in the parameters for the stop thread module 812. The stop thread module 812 is thus effectively a plurality of stop thread modules operating in parallel.

Figure 9:
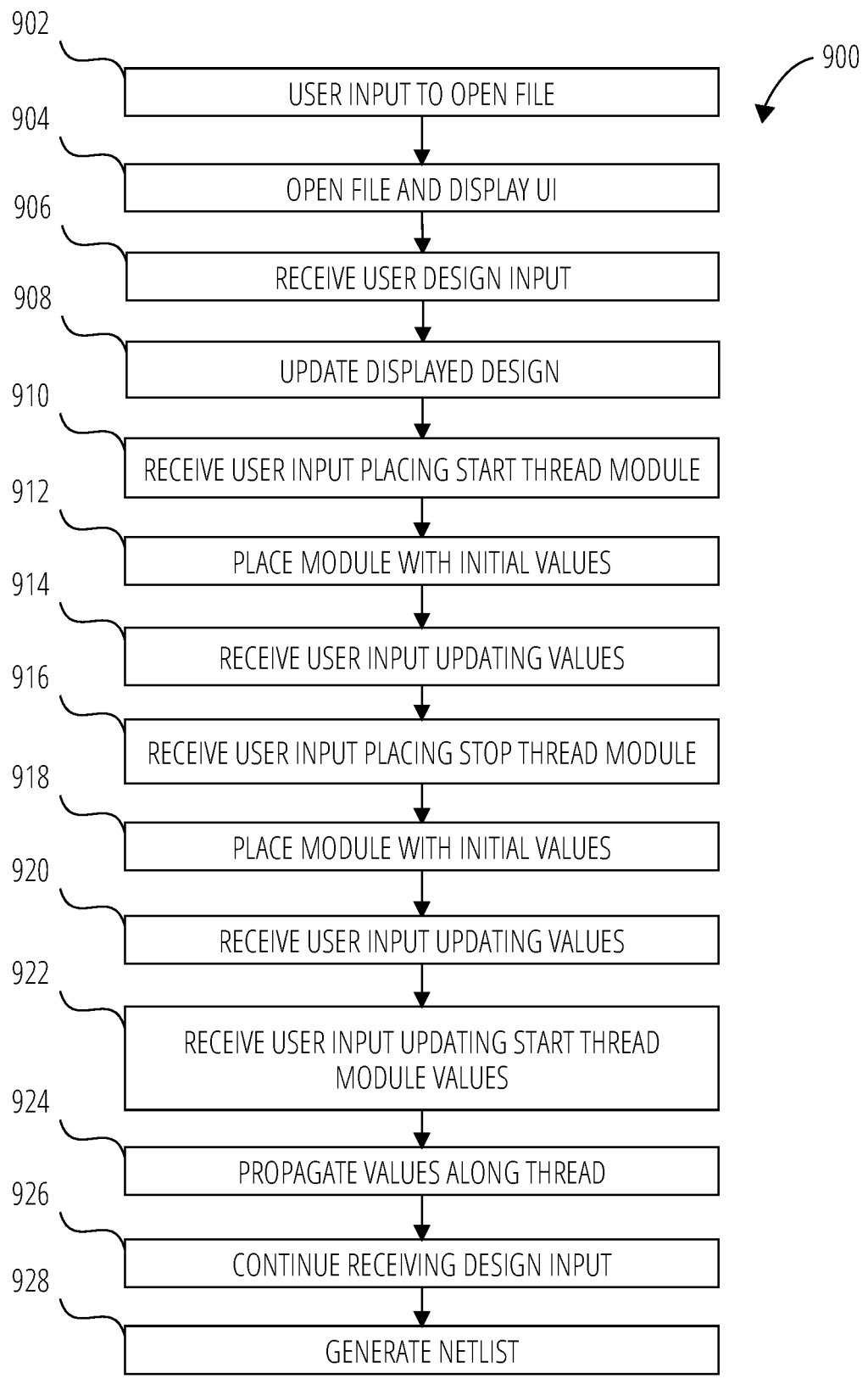
FIG. 9 illustrates a flowchart 900 for generating customized audio processing designs according to some examples.

FIG. 9 illustrates a flowchart 900 for generating customized audio processing designs according to some examples. For explanatory purposes, the operations of the flowchart 900 are described herein as occurring in serial, or linearly. However, multiple operations of the flowchart 900 may occur in parallel. In addition, the operations of the flowchart 900 need not be performed in the order shown and/or one or more blocks of the flowchart 900 need not be performed and/or can be replaced by other operations.

The flowchart 900 illustrates the creation or editing of an audio processing design by a developer of customized audio processing. This is done for example on a developer device 110 that hosts an application for use in developing downloadable custom audio features for the audio DSP core 212. The application is preferably a windows-based graphical design environment that permits the definition of audio processing pathways by assembling and interconnecting various audio processing blocks and specifying associated parameters and interconnections. The flowchart 900 in particular relates to the creation of an audio design including multiple threads, using the start thread module and stop thread module as discussed above.

The method is described with reference to design software executing on the developer device 110, although many variations are possible, including the design interface and functionality being hosted as an application service on server 106. In such a case, the operations being performed on the server 106 will not involve the display of user interface elements as such, but rather the transmission of data and instructions for causing the display of user interface elements at a remote computing device. Accordingly, "to display an element/displaying of an element" as used herein includes causing of the display of such an element.

The method commences at operation 902 with receipt of user input at the developer device 110 to open an audio processing design file. In response, a new or existing audio processing design file is opened and the design user interface is displayed on the display of the developer device 110 by the design software, in operation 904. In operation 906, user input is received to create or modify an audio processing design. As discussed above, this is performed by receiving user input that selects, positions, interconnects and defines the parameters of design modules, such as those described above with reference to FIGS. 3 to 8. In operation 908, the design software updates and displays the updated design on the display of the client device 108 in operation 908.

In the event that the designer wants to create a thread, the designer provides input to position a start thread module (such as start thread module 318) at the desired location in the audio design, between the actual or intended positions of upstream and downstream audio modules. In response to receiving such input in operation 910, the design software places and displays the start thread module in the selected location in operation 912, with initial parameter values based either on defaults or on the parameters of the input to the start thread module at the selected location. For example, the thread number will be the integer multiple of the system input block size that is received at the input to the start thread module, the sub-thread ID will be the next letter of the alphabet and the buffer up factor will be 1.

User input updating the buffer up factor, the number of pins and the thread subsidiary ID can then optionally be received at operation 914. Updating the buffer up factor will alter the thread ID number as discussed above. Modifications to the parameters of the start thread module will be propagated downstream from the start thread module, as appropriate and as discussed herein.

In operation 916, user input to position a stop thread module (such as stop thread module 322) at the desired location in the audio design is received. In response to receiving such input, in operation 918 the design software places the stop thread module in the selected location in operation 918, with initial parameter values based either on defaults or on existing parameters in the audio processing design, for example from an upstream start thread module and the downstream thread ID. For example, the thread number and subsidiary thread ID will be as currently defined for the downstream thread, and the buffer down factor will default to be equal to the buffer up factor of the upstream start thread module.

User input updating the buffer down factor, the number of pins and the thread subsidiary ID can then optionally be received at operation 920.

In operation 922, user input may be received to update a start thread module's parameters, including input updating the buffer up factor, the number of pins and the thread subsidiary ID can then optionally be received. Updating the buffer up factor will alter the thread ID number as discussed above. Modifications to the parameters of the start thread module will be propagated downstream from the start thread module, as appropriate, in operation 924, to all intervening audio processing modules up to and including the stop thread module that terminates the subordinate thread. For example, a change of the buffer up factor from 1 to 2 will double the block size for all intervening modules and will set the buffer down factor of the terminating stop thread module to 2, so that blocks of the correct size leave the stop thread module.

Further user design input can be received in operation 926. This may for example be as discussed above with reference to operations 906, 910, 916 and 922. When the design is complete, user input may be received to generate the binary file 202, which is then performed by the design software in operation 928. The binary file 202 specifies the audio processing design based on the arrangement of the representations of the audio processing modules displayed in the user interface. The binary file 202 is then available to be loaded into an audio DSP core 212 to provide the customized audio processing.

Figure 10:
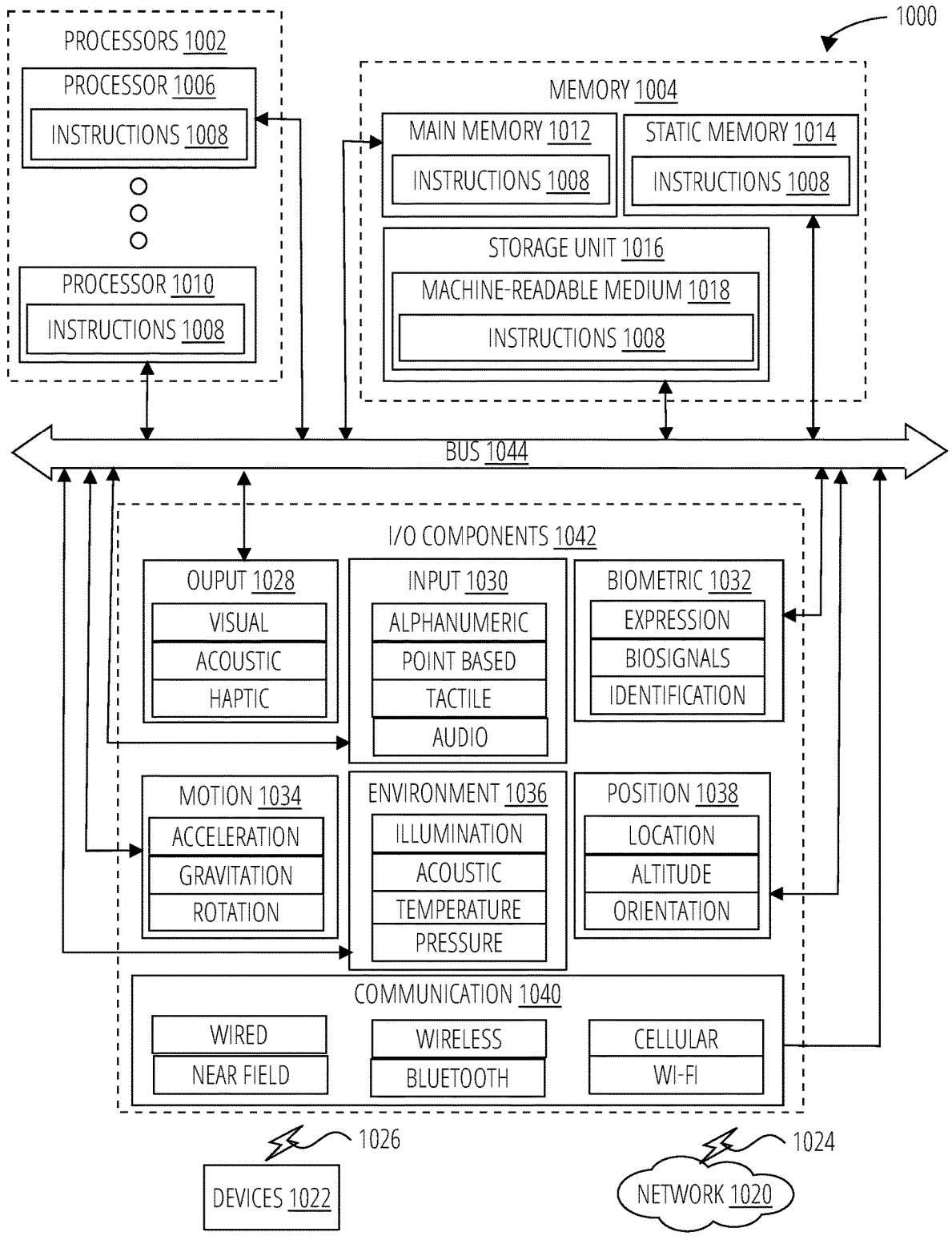
FIG. 10 illustrates a diagrammatic representation of a machine in the form of a computer system within which a set of instructions may be executed for causing the machine to perform any one or more of the methodologies discussed herein, according to an example.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1008 (e.g., software, a program, an application, an applet, an app, or other executable code) for causing the machine 1000 to perform any one or more of the methodologies discussed herein may be executed. For example the instructions 1008 may cause the machine 1000 to execute the methods described above. The instructions 1008 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines 1000 that individually or jointly execute the instructions 1008 to perform any one or more of the methodologies discussed herein.

The machine 1000 may include processors 1002, memory 1004, and I/O components 1042, which may be configured to communicate with each other such as via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that may execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 may include a main memory 1012, a static memory 1014, and a storage unit 1016, both accessible to the processors 1002 such as via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones will likely include a touch input device or other such input mechanisms, while a headless server machine will likely not include such a touch input device. It will be appreciated that the I/O components 1042 may include many other components that are not shown in FIG. 10. The I/O components 1042 are grouped according to functionality merely for simplifying the following discussion and the grouping is in no way limiting. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 may include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (i.e., memory 1004, main memory 1012, static memory 1014, and/or memory of the processors 1002) and/or storage unit 1016 may store one or more sets of instructions and data structures (e.g., software) embodying or utilized by any one or more of the methodologies or functions described herein. These instructions (e.g., the instructions 1008), when executed by processors 1002, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1020 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1020 or a portion of the network 1020 may include a wireless or cellular network, and the coupling 1024 may be a Code Division Multiple Access (CDMA) connection, a Global System for Mobile communications (GSM) connection, or another type of cellular or wireless coupling. In this example, the coupling 1024 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1008 may be transmitted or received over the network 1020 using a transmission medium via a network interface device (e.g., a network interface component included in the communication components 1040) and utilizing any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1008 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method, executed by one or more processors, the method comprising:
    receiving user input to generate an audio processing design by placing representations of audio processing modules in a user interface;
    causing the display of the representations of the audio processing modules in the user interface;
    receiving user input to place a representation of a start thread module in the audio processing design between a representation of an upstream audio module and representations of downstream audio modules, the representation of the start thread module having data associated therewith that defines a buffer up factor and a thread identifier;
    causing the display of the representation of the start thread module in the audio processing design;
    receiving user input to specify the buffer up factor and thread identifier associated with the representation of the start thread module;
    applying the specified thread identifier and a sample block size that is derived from the specified buffer up factor, downstream from the representation of the thread start module such that the sample block size and the specified thread identifier are associated with the representations of the downstream audio modules; and
    specifying the audio processing design based on an arrangement of the representations of the audio processing modules displayed in the user interface.

2. The method of claim 1 wherein the buffer up factor is settable to 1 (one).

3. The method of claim 1 wherein the thread identifier comprises a thread number that is an integer value corresponding to multiples of an audio processing design input block size.

4. The method of claim 3 wherein the sample block size is an audio processing design input block size multiplied by the buffer up factor and a thread number of an input thread to the start thread module.

5. The method of claim 3 wherein the thread identifier comprises a subsidiary thread identifier comprising a next available letter of the alphabet.

6. The method of claim 1, further comprising:
    receiving user input to place a representation of a stop thread module in the audio processing design downstream of the representation of the start thread module, wherein applying the specified thread identifier and the sample block size downstream from the representation of the start thread module comprises associating the specified thread identifier and the sample block size with representations of downstream audio modules up to and including the representation of the stop thread module.

7. The method of claim 6, wherein an initial value of a buffer down value associated with the representation of the stop thread module corresponds to the buffer up value associated with the upstream representation of the start thread module, and the initial value of a thread number associated with the representation of the stop thread module corresponds to a downstream thread number.

8. The method of claim 1 wherein a default value of the buffer up factor is 1 (one).

9. A non-transitory computer-readable storage medium, the computer-readable storage medium including instructions that when executed by a computer, cause the computer to perform operations comprising:
    receiving user input to generate an audio processing design by placing representations of audio processing modules in a user interface;
    causing the display of the representations of the audio processing modules in the user interface;
    receiving user input to place a representation of a start thread module in the audio processing design between a representation of an upstream audio module and representations of downstream audio modules, the representation of the start thread module having data associated therewith that defines a buffer up factor and a thread identifier;
    causing the display of the representation of the start thread module in the audio processing design;
    receiving user input to specify the buffer up factor and thread identifier associated with the representation of the start thread module;
    applying the specified thread identifier and a sample block size that is derived from the specified buffer up factor, downstream from the representation of the thread start module such that the sample block size and the specified thread identifier are associated with the representations of the downstream audio modules; and
    specifying the audio processing design based on an arrangement of the representations of the audio processing modules displayed in the user interface.

10. The non-transitory computer-readable storage medium of claim 9 wherein the thread identifier comprises a thread number that is an integer value corresponding to multiples of an audio processing design input block size.

11. The non-transitory computer-readable storage medium of claim 10 wherein the sample block size is an audio processing design input block size multiplied by the specified buffer up factor and a thread number of an input thread to the start thread module.

12. The non-transitory computer-readable storage medium of claim 10 wherein the thread identifier comprises a subsidiary thread identifier comprising a next available letter of the alphabet.

13. The non-transitory computer-readable storage medium of claim 9 wherein the buffer up factor is settable to 1 (one).

14. The non-transitory computer-readable storage medium of claim 9 wherein the operations further comprise:
receiving user input to place a representation of a stop thread module in the audio processing design downstream of the representation of the start thread module, wherein applying the specified thread identifier and the sample block size downstream from the representation of the start thread module comprises associating the specified thread identifier and the sample block size with representations of downstream audio modules up to and including the representation of the stop thread module.

15. The non-transitory computer-readable storage medium of claim 14 wherein an initial value of a buffer down value associated with the representation of the stop thread module corresponds to the buffer up value associated with the upstream representation of the start thread module, and the initial value of a thread number associated with the representation of the stop thread module corresponds to a downstream thread number.

16. A computing apparatus comprising:
a processor; and
a memory storing instructions that, when executed by the processor, configure the apparatus to perform operations comprising:
receiving user input to generate an audio processing design by placing representations of audio processing modules in a user interface;
causing the display of the representations of the audio processing modules in the user interface;
receiving user input to place a representation of a start thread module in the audio processing design between a representation of an upstream audio module and representations of downstream audio modules, the representation of the start thread module having data associated therewith that defines a buffer up factor and a thread identifier;
causing the display of the representation of the start thread module in the audio processing design;
receiving user input to specify the buffer up factor and thread identifier associated with the representation of the start thread module;
applying the specified thread identifier and a sample block size that is derived from the specified buffer up factor, downstream from the representation of the thread start module such that the sample block size and the specified thread identifier are associated with the representations of the downstream audio modules; and
specifying the audio processing design based on an arrangement of the representations of the audio processing modules displayed in the user interface.

17. The computing apparatus of claim 16 wherein the operations further comprise:
receiving user input to place a representation of a stop thread module in the audio processing design downstream of the representation of the start thread module, wherein applying the specified thread identifier and the sample block size downstream from the representation of the start thread module comprises associating the specified thread identifier and the sample block size with representations of downstream audio modules up to and including the representation of the stop thread module.

18. The computing apparatus of claim 17 wherein an initial value of a buffer down value associated with the representation of the stop thread module corresponds to the buffer up value associated with the upstream representation of the start thread module, and the initial value of a thread number associated with the representation of the stop thread module corresponds to a downstream thread number.

19. The computing apparatus of claim 16 wherein the buffer up factor is settable to 1 (one).

20. The computing apparatus of claim 16 wherein the thread identifier comprises a thread number that is an integer value corresponding to multiples of an audio processing design input block size.

* * * * *